United States Patent [19]
Wan

[11] Patent Number: 5,533,394
[45] Date of Patent: *Jul. 9, 1996

[54] FERROELECTRIC THIN FILM TRAVELLING WAVE ROTATION SENSOR

[75] Inventor: Lawrence A. Wan, Malibu, Calif.

[73] Assignee: BEI Electronics, Inc., San Francisco, Calif.

[*] Notice: The term of this patent shall not extend beyond the expiration date of Pat. No. 5,533,398.

[21] Appl. No.: 262,095

[22] Filed: Jun. 20, 1994

Related U.S. Application Data

[62] Division of Ser. No. 955,589, Oct. 5, 1992, abandoned.
[51] Int. Cl.⁶ .................................................. G01P 9/00
[52] U.S. Cl. .................................. 73/504.01; 73/504.02
[58] Field of Search ..................... 73/505, 504, DIG. 1, 73/504.01, 504.02, 504.13; 310/324

[56] References Cited

U.S. PATENT DOCUMENTS

| | | | |
|---|---|---|---|
| 3,307,409 | 3/1967 | Newton | 73/505 |
| 4,644,793 | 2/1987 | Church | 73/505 |
| 4,655,081 | 4/1987 | Burdess | 73/505 |

*Primary Examiner*—John E. Chapman
*Attorney, Agent, or Firm*—Townsend and Townsend and Crew

[57] ABSTRACT

A diaphragm is disposed over a cavity formed in a silicon base. A plurality of electrodes are radially disposed about the diaphragm overlying the cavity, and a signal applying circuit applies a signal to the plurality of electrodes so that portions of the diaphragm flex for establishing a net angular momentum (e.g., the flexing of the diaphragm simulates a circumferentially traveling wave). A deformation sensing circuit comprising a plurality of strain gages interconnected to form a corresponding plurality of Wheatstone bridges are disposed about the periphery of the cavity along orthogonal axes for sensing deformation of the structure about the orthogonal axes.

21 Claims, 2 Drawing Sheets

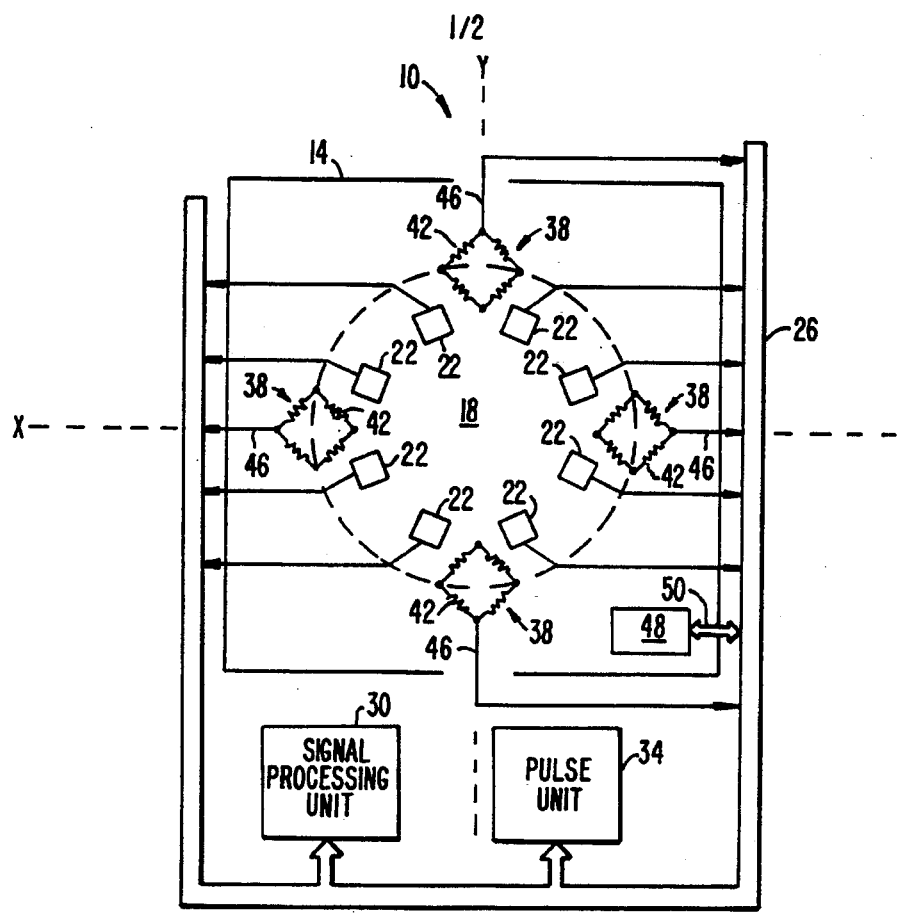
FIG. 1.
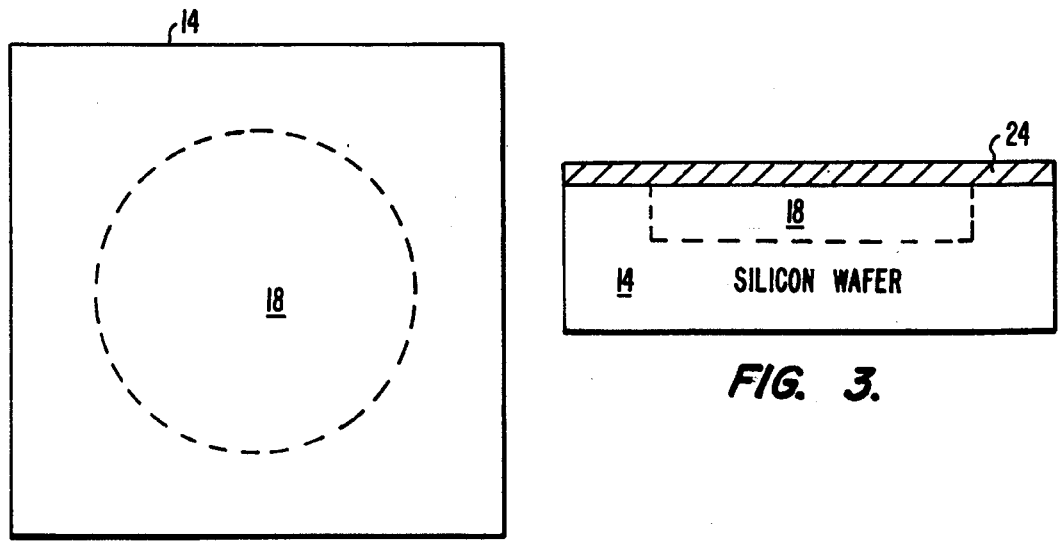
FIG. 2.
FIG. 3.

FERROELECTRIC THIN FILM TRAVELLING WAVE ROTATION SENSOR

This is a division of application Ser. No. 07/955,589 filed Oct. 5, 1992, abandoned.

BACKGROUND OF THE INVENTION

The present invention relates to rotation sensors and, more particularly, to a thin film travelling wave rotation sensor.

Navigational and inertial guidance systems for many type of craft often use data about the angular rate of motion of the craft to control the desired movement of the craft. One device which provides data about angular motion is the well known gyroscope. Gyroscopes, however, have many disadvantages. They are physically large and heavy, yet they must be built to extremely high accuracies at great costs, and they may be damaged by even low levels of shock and vibration. To minimize the effects of shock and vibration, they must be protected with heavy mounting devices, thus further increasing size, weight and cost. Furthermore, since critical moveable elements, such as bearings, usually wear with use, the gyroscopes must be frequently maintained to retain precision. Despite the frequent maintenance and high accuracy required, they still may have an error drift rate of fractions of a degree per hour.

Another type of angular motion sensor which attempts to overcome the disadvantages of traditional gyroscopes is disclosed in U.S. Pat. No. 4,899,587, issued to Juergen H. Staudte. That patent discloses an angular rate sensor comprising first and second tuning forks made of quartz. The stems of the forks are coupled together end to end along an axis of symmetry so that the tines face away from each other and lie in a plane. A mount is provided for attaching the dual fork structure to a support. Energy is provided to the tines of the first fork from a pair of electrodes coupled to an oscillator. The oscillator signals cause the tines of the first fork to vibrate in the plane. When the structure rotates above the axis of symmetry, a Coriolis force causes the tines of the second fork to vibrate in a direction normal to the plane. The vibratory motion of the tines of the second fork is sensed with output electrodes for providing a signal indicating angular motion about the single axis.

Unfortunately, the electronics required for driving and sensing the vibratory motion of the forks is very complex, and the output signals are difficult to extract. The device is extremely susceptible to acoustic and vibrational interference, and the piezoelectric properties of quartz make the device very sensitive to stray capacitances. The support mounting for the fork structure creates unwanted stresses and points of failure, and the temperature anomalies of quartz create other electrical and mechanical difficulties. Finally, each device can sense rotation along only a single axis.

United States patent application Ser. No. 07/751,280 entitled "Rotation Sensor" was filed by the present inventor on Aug. 29, 1991, and it is incorporated herein by reference. That application discloses a "travelling wave" rotation sensor capable of sensing rotation about two axes wherein the complete structure may be micromachined from a silicon substrate using well known photolithographic and etching techniques. In one embodiment of that invention, a silicon chip is micromachined so that a plurality of tines extend radially and coplanarly from an outer peripheral surface of a circular base. First and second mounting members extend from the base for mounting the base to a support. The first mounting member is disposed generally perpendicularly to the second mounting member. A pulse generator applies electrostatic or electromagnetic pulses to successive free ends of the plurality of tines so that each tine momentarily vibrates in the plane in rotational sequence along the circumference of the base. The successive vibrations establish a net angular momentum approximating a spinning wheel so that rotation of the sensor about the axis of one of the first or second mounting members causes the other mounting member to experience a deformation due to Coriolis force. A plurality of piezoresistive strain gages interconnected to form Wheatstone bridges are disposed on the first and second mounting members for sensing deformation of the first and second mounting members and thus providing signals representative of angular rotation about the first and second axes.

SUMMARY OF THE INVENTION

The present invention is directed to a travelling wave rotation sensor which is simple to construct, does not suffer from the inherent problems of temperature non-linearity, zero rate offset, acoustic susceptibility, cross-coupling of drive and pick up signals, etc., associated with quartz tuning fork rotation sensors, and provide even greater signal level, higher resolution, greater sensitivity and wider dynamic range than the travelling wave rotation sensor disclosed in the above-mentioned patent application Ser. No. 07/751,280.

In one embodiment of the present invention, a diaphragm is disposed over a cavity formed in a silicon base. A plurality of electrodes are circumferentially disposed about the diaphragm overlying the cavity, and a signal applying circuit applies a signal to the plurality of electrodes so that portions of the diaphragm flex for establishing a net angular momentum (e.g., the flexing of the diaphragm simulates a circumferentially traveling wave). A deformation sensing circuit comprising a plurality of strain gages interconnected to form a corresponding plurality of Wheatstone bridges are disposed about the periphery of the cavity along orthogonal axes for sensing deformation of the structure about the orthogonal axes. An optional linear accelerometer may be fabricated together with the rotation sensor, and the entire structure may be sealed by a silicon cover. The electronics used to operate the rotation sensor may be fabricated with the rotation sensor by direct diffusion in the silicon or by bonding an ASIC chip to the base and/or cover.

BRIEF DESCRIPTION OF THE DRAWINGS

FIG. 1 is a top view of a particular embodiment of a rotation sensor according to the present invention;

FIG. 2 is a top view of a particular embodiment of an etched silicon wafer which functions as a base for construction of the rotation sensor according to the present invention;

FIGS. 3–4 are side cross sectional views of particular embodiments of initial process steps used to construct a rotation sensor according to the present invention;

DETAILED DESCRIPTION OF THE PREFERRED EMBODIMENTS

Figure 4:
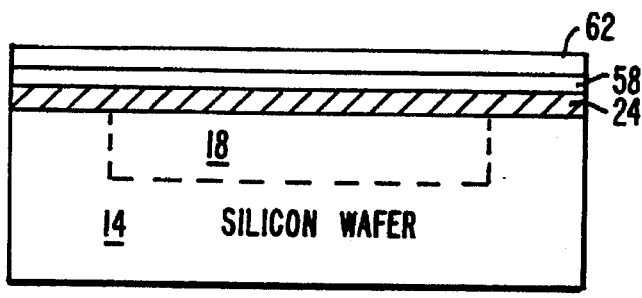

FIG. 1 is a top view of a particular embodiment of a rotation sensor 10 according to the present invention. Rotation sensor 10 comprises a base 14 having a cavity 18 etched therein. In this embodiment, cavity 18 is cylindrically shaped, but many other shapes could be employed. A plurality of electrodes 22 are circumferentially disposed over a silicon nitride layer 24 (FIG. 3) which, in turn, is disposed over the cavity. Each electrode is coupled to a communication path 26 which, in turn, is coupled to a signal processing unit 30 and to a pulse unit 34. A plurality of Wheatstone bridges 38 are disposed about the periphery of the cavity along the X and Y axes shown. Each Wheatstone bridge 38 comprises a plurality of resistances 42 interconnected in the well known manner, and they are coupled to communication path 26 through a corresponding plurality of communication paths 46. A linear accelerometer 48, constructed in accordance with the teachings of U.S. patent application Ser. No. 07/751,280, discussed above, may be formed as a part of the rotation sensor, and accelerometer 48 may be coupled to communication path 26 through a communication path 50.

In operation, pulse unit 34 applies opposite phase pulses to pairs of adjacent electrodes 22. The compression and expansion effect of the opposing electric field between the adjacent electrodes flex the sector of silicon nitride layer 24 between them. The excitation of adjacent electrode pairs is continued in a sequential manner circumferentially about the plurality of electrodes 22 so that the sequential flexures of silicon nitride layer 24 simulate a high rpm traveling wave encircling the cavity, thus establishing a net angular momentum. If the structure rotates about the X axis, then deformation of the structure about the Y axis occurs as a result of Coriolis force, and this deformation is sensed by the Wheatstone bridges disposed along the Y axis. Similarly, if the structure rotates about the Y axis, then deformation of the structure about the X axis occurs, and this deformation is sensed by the Wheatstone bridges disposed along the X axis. The signals from the Wheatstone bridges are then processed by signal processing unit 30 to produce a direct indication of the amount of angular rotation. Signal processing unit 30 also may process the signals from linear accelerometer 48 to provide an indication of the amount of linear acceleration of the structure.

FIGS. 2–7 illustrate the steps used to fabricate the rotation sensor shown in FIG. 1.

As shown in FIGS. 2 and 3, cylindrical cavity 18 is formed in base 14 by diffusing an oxide layer or depositing phosphosilicate glass (PSG) in the shape of a cylinder (or whatever shape is desired for cavity 18), silicon nitride layer 24 having a thickness of 1.0 micron to 10.0 microns is formed over base 14 by chemical vapor deposition, and the PSG or sacrificial oxide layer is dissolved in a buffered HF solution. Thereafter, as shown in FIG. 4, a titanium and platinum layer 58 having a thickness of 0.25 to 0.50 micron is deposited over silicon nitride layer 24. Titanium and platinum layer 58 functions as a uniform conducting ground plane electrode in the finished device. Next, a ferroelectric layer 62 having a thickness of 0.2 to 0.5 micron is deposited by chemical vapor deposition over layer 58. Ferroelectric layer 62 may comprise a PZT thin film or any other material having ferroelectric properties which adheres well to titanium and platinum layer 58.

Figure 5:
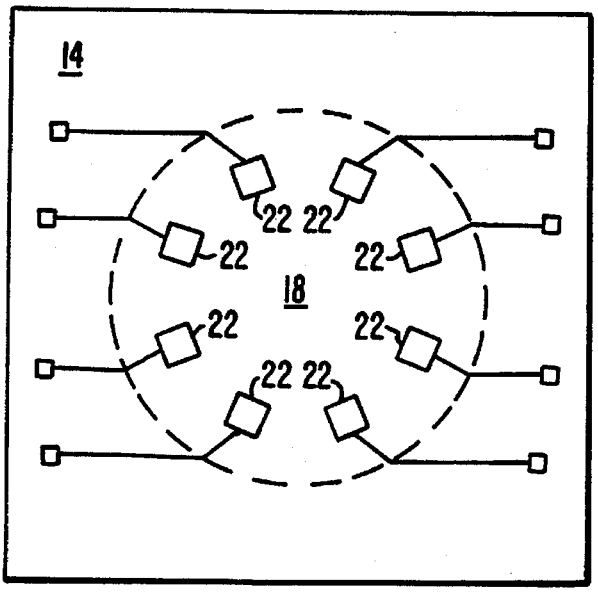
FIG. 5 is a top view of a particular embodiment of a rotation sensor according to the present invention showing the location of conductive electrodes.
Figure 6:
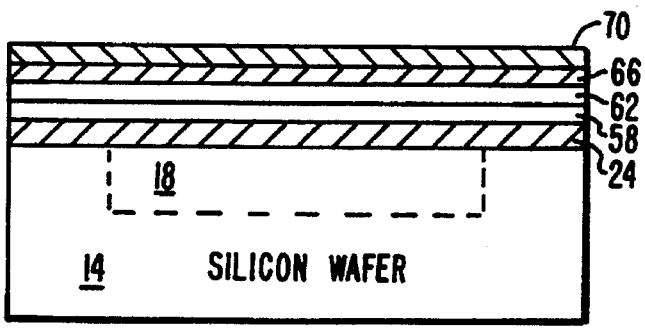
FIGS. 6 and 7 are side cross sectional views showing particular embodiments of further process steps used for forming a rotation sensor according to the present invention.
Figure 7:
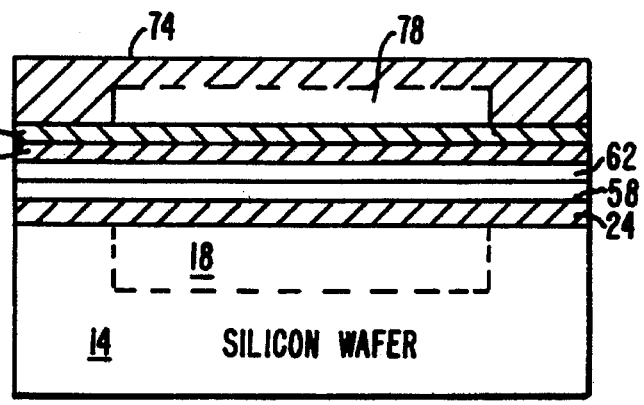

As shown in FIG. 5, the plurality of gold electrodes 22 are then formed by depositing and etching a gold layer having a thickness of approximately 0.25 to 0.75 micron. Then, as shown in FIG. 6, an insulating silver nitride layer 66 having a thickness of 0.5 micron to 1.0 micron is deposited over electrodes 22, and a polysilicon layer 70 having a thickness of 200 to 500 nanometers is deposited over silver nitride layer 66.

Portions of polysilicon layer 70 disposed about the circumference of cavity 18 at the intersection of the x and y axes are then heavily doped with boron to form piezoresistances 42 and Wheatstone bridges 38. The polysilicon piezoresistance strain gages achieve wide temperature range linearity and high gage factor. Thus, the sensing elements are inherently linear, stable, without zero-rate offset, and without hysteresis. It should also be noted that the sensing and drive elements are totally phenomenonically decoupled and independent, so the cross talk problems associated with using piezoelectric structures for both the drive and sensing elements (as in quartz sensors) are avoided.

A silicon nitride layer 74 may be formed over the structure by pulse enhanced chemical vapor deposition to form a protective encasement for the device. Silicon nitride layer 74 preferably includes a cavity 78 overlying cavity 18 to maintain flexibility of silicon nitride layer 24.

Not only are rotation sensors constructed according to the teachings of the present invention superior to quartz rotation sensors, but they also provide advantages in addition to those found in rotation sensors constructed in accordance with the teachings of application Ser. No. 07/751,280 discussed above. For example, the drive voltage for a rotation sensor constructed according to the teachings of the present invention may be approximately three volts (rather than the much higher voltages required for quartz and other rotation sensors) which makes the rotation sensor compatible with on-chip integrated circuits and microprocessors. Furthermore, even when operating at the low voltages, the rotation sensor has greater sensitivity to deformation induced by Coriolis forces than the aforementioned travelling wave rotation sensor. That is because the maximum energy density that may be stored in the air gap of the electrostatic drive in the travelling wave rotation sensor is $\frac{1}{2} e_{air} E^2_{bd}$ where $E_{bd}$ is the maximum electric field before breakdown (approximately $10^8$ volts per meter for a one micrometer gap) and where $e_{air}$ is the permitivity of air which is equal to that of free space. On the other hand, for ferroelectric layer 62, the energy density between each electrode and the ground electrode is $\frac{1}{2} e_f E^2_{bd}$ where the maximum $E_{bd}$ is about the same for ferroelectric layer 62 as for air but the dielectric constant $e_f$ of ferroelectric layer 62 is approximately 1,300 times that of air. This results in three orders of magnitude greater electric field density, which translates into greater sensitivity. It is also the high electric field which causes silicon nitride layer 24 to flex.

Unlike mechanical gyroscopes or quartz rotation sensors, the materials and processes employed to fabricate a rotation sensor according to the present invention are all semiconductor based, so any electronics, including microprocessors and self test structures, may be integrated on the same wafer by further conventional semiconductor processing. Thus, an entire navigation, guidance or control subsystem/system can be fabricated on a single chip. Furthermore, there are no moving or vibrating mechanical parts and no need for troublesome mechanical mounting structures and assembly tools as with other rotation sensors. With dimensions on the order of microns, hundreds or thousands of dyes or complete devices can be fabricated on a single wafer.

While the above is a complete description of a preferred embodiment of the present invention, various modifications may be employed. Consequently, the scope of the invention should be ascertained by the appended claims.

I claim:

1. A rotation sensor comprising:

a diaphragm;

a plurality of electrodes disposed about the diaphragm;

a ground plane;

a ferroelectric material disposed in close proximity to and between the plurality of electrodes and the ground plane;

signal applying means, coupled to the plurality of electrodes, for applying a signal to the plurality of electrodes in a circular manner, thereby compressing and expanding the ferroelectric material and causing the diaphragm to flex in a circular manner, whereby an angular momentum of a travelling wave is created; and deformation sensing means for sensing deformation of the diaphragm.

2. A rotation sensor comprising:

a base having a cavity disposed on a surface thereof;

a diaphragm disposed about the base overlying the cavity;

a plurality of electrodes disposed about the diaphragm over the cavity;

a ground plane;

a ferroelectric dielectric material disposed in close proximity to and between the plurality of electrodes and the ground plane;

signal applying means coupled to the plurality of electrodes, for applying a signal to the plurality of electrodes, thereby compressing and expanding the dielectric material and causing the diaphragm to flex, whereby an angular momentum is created; and deformation sensing means for sensing deformation of the diaphragm.

3. The rotation sensor according to claim 2 wherein the deformation sensing means comprises a polysilicon layer doped to form a plurality of strain gages.

4. The rotation sensor according to claim 2 wherein the deformation sensing means comprises a plurality of Wheatstone bridges.

5. The rotation sensor according to claim 2 wherein the deformation sensing means is disposed about the periphery of the cavity.

6. The rotation sensor according to claim 2 wherein the plurality of electrodes are disposed circumferentially about the diaphragm.

7. The rotation sensor according to claim 2 wherein the diaphragm is disposed adjacent to the ground plane.

8. The rotation sensor according to claim 2 wherein the dielectric material is disposed adjacent to both the ground plane and the plurality of electrodes.

9. The rotation sensor according to claim 2 wherein the dielectric constant of the dielectric material is approximately 1300 times a dielectric constant of air.

10. The rotation sensor according to claim 2 wherein the dielectric material comprises a dielectric layer disposed between the diaphragm and the plurality of electrodes.

11. The rotation sensor according to claim 2 wherein the diaphragm comprises a first silicon nitride layer, and further comprises a second silicon nitride layer disposed over the plurality of electrodes.

12. The rotation sensor according to claim 2 wherein the diaphragm is disposed adjacent to the dielectric material.

13. The rotation sensor according to claim 2 wherein the signal applying means applies different-phase signals to adjacent pairs of the plurality of electrodes.

14. The rotation sensor according to claim 13 wherein the signal applying means sequences the application of the different-phase signals circularly about the plurality of electrodes.

15. The rotation sensor according to claim 2 wherein the diaphragm is disposed between the ground plane and the plurality of electrodes.

16. The rotation sensor according to claim 2 wherein the base comprises a semiconductor material.

17. The rotation sensor according to claim 2 further comprising means for encasing the electrode structure.

18. The rotation sensor according to claim 17 wherein the encasing means comprises a silicon nitride layer disposed over the plurality of electrodes, the silicon nitride layer having a cavity formed on a surface thereof, the silicon nitride layer cavity being generally aligned with the cavity in the base.

19. The rotation sensor according to claim 1 wherein the signal applying means comprises means for establishing approximately a three-volt potential difference between an electrode and the ground plane.

20. The rotation sensor according to claim 2 wherein the signal applying means comprises means for establishing approximately a three-volt potential difference between an electrode and the ground plane.

21. The rotation sensor of claim 2 wherein said rotation sensor includes a plurality of layers and said deformation sensing means is in a different layer than said electrodes.

* * * * *